June 14, 1949. J. RICKARD 2,473,447
WHIFFLE TREE
Filed April 21, 1947
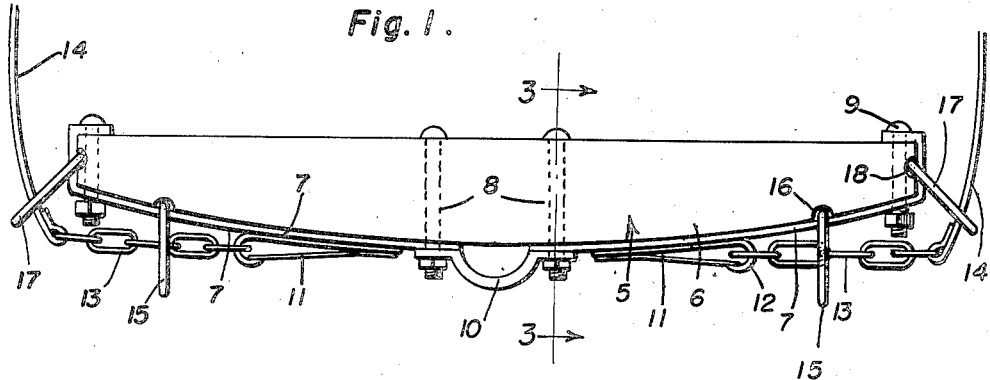
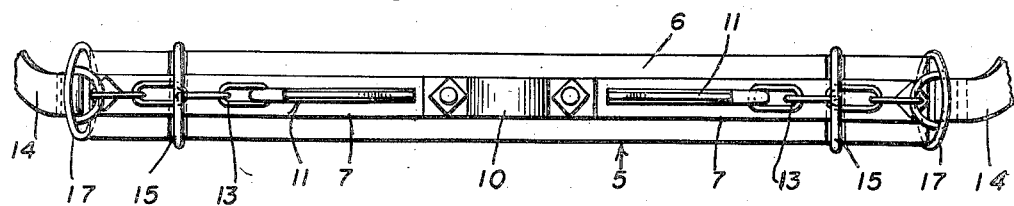
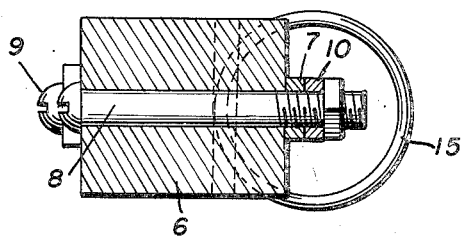
Inventor
Joseph Rickard Patented June 14, 1949

2,473,447

UNITED STATES PATENT OFFICE 2,473,447

WHIFFLE TREE

Joseph Rickard, Hancock, N. Y.

Application April 21, 1947, Serial No. 742,763

1 Claim. (Cl. 278—102)

The present invention relates to new and useful improvements in whiffle trees and has for its primary object to provide means for attaching the trace to the whiffle tree without danger of accidental unfastening of the tree.

A further object of the invention is to provide a device of this character of simple and practical construction, which is efficient and reliable in use, embodying means by which the trace may be easily and quickly attached to the whiffle tree and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view;

Figure 2 is a rear elevational view; and

Figure 3 is an enlarged sectional view taken on a line 3—3 in Figure 1.

Referring now to the drawings in detail wherein for the purpose of illustration I have disclosed a preferred embodiment of the invention, the numeral 5 designates the whiffle tree generally and which comprises preferably a wooden bar 6 to the rear edge of which is secured a pair of reinforcing plates 7 which have their inner ends secured to the bar by bolts 8 and which have their outer ends extending over the end of the bar and inwardly at the front edge thereof and secured to the bar by bolts 9. The bolts 8 are also used for attaching a metal loop 10 at the center of the bar 6 at its rear edge and by means of which the whiffle tree is attached to a wagon or other vehicle.

A snap hook 11 is welded or otherwise secured at its back to each of the reinforcing plates 7 adjacent the inner end of the latter, the bill portion 12 of the hook extending in a direction toward the outer end of the whiffle tree and to which one end of a short chain section 13 is attached, the other end of the chain being suitably secured to the rear end of a trace 14.

The chain 13 extends through a guide ring 15 which is freely carried in an opening 16 at the rear edge of the bar 6 behind the reinforcing plate 7 and the trace 14 also extends through a guide ring 17 which is freely carried in an opening 18 at the end of the bar 6 and also behind the reinforcing plate 7. The guide rings 15 and 17 hold the chain 13 and rear end of the trace 14 closely to the whiffle tree to prevent the chain and trace from dropping below the whiffle tree and so that the trace 14 extends in a forward direction outwardly at the end of the whiffle tree as shown in Figure 1 of the drawings.

The snap hooks 12 secure the chain 13 against accidental separation therefrom.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

What I claim is:

A whiffle tree including an elongated member, a reinforcing plate at the rear edge at each end of the member and extending horizontally around the end of the member and inwardly at the front edge thereof, a snap hook secured to the plate adjacent its inner end for attaching a trace thereto, and guide rings for the trace carried by the plate to hold the trace in position along the rear edge of the member and at the end thereof.

JOSEPH RICKARD.

REFERENCES CITED

The following references are of record in the file of this patent:

UNITED STATES PATENTS

| Number | Name | Date |
|---|---|---|
| 712,621 | Threlkeld | Nov. 4, 1902 |
| 833,808 | True | Oct. 23, 1906 |
| 903,740 | Levins | Nov. 10, 1908 |